US011858784B2

(12) United States Patent
Minami

(10) Patent No.: US 11,858,784 B2
(45) Date of Patent: Jan. 2, 2024

(54) CRANE AND CONTROL SYSTEM FOR CRANE

(71) Applicant: TADANO LTD., Kagawa (JP)

(72) Inventor: Yoshimasa Minami, Kagawa (JP)

(73) Assignee: TADANO LTD., Kagawa (JP)

(*) Notice: Subject to any disclaimer, the term of this patent is extended or adjusted under 35 U.S.C. 154(b) by 599 days.

(21) Appl. No.: 17/257,635

(22) PCT Filed: Jul. 18, 2019

(86) PCT No.: PCT/JP2019/028259
§ 371 (c)(1),
(2) Date: Jan. 4, 2021

(87) PCT Pub. No.: WO2020/022181
PCT Pub. Date: Jan. 30, 2020

(65) Prior Publication Data

US 2021/0284507 A1 Sep. 16, 2021

(30) Foreign Application Priority Data

Jul. 25, 2018 (JP) ................................ 2018-139849

(51) Int. Cl.
*B66C 13/22* (2006.01)
*B66C 13/06* (2006.01)

(52) U.S. Cl.
CPC ............ *B66C 13/22* (2013.01); *B66C 13/063* (2013.01); *B66C 2700/0364* (2013.01); *B66C 2700/08* (2013.01)

(58) Field of Classification Search
CPC .................. B66C 13/22; B66C 13/063; B66C 2700/0364; B66C 2700/08
See application file for complete search history.

(56) References Cited

U.S. PATENT DOCUMENTS 3,921,818 A * 11/1975 Yamagishi .............. B66C 13/22 340/685
5,119,949 A * 6/1992 Kishi ...................... B66C 23/90 212/277

(Continued)

FOREIGN PATENT DOCUMENTS

JP H07-081876 A 3/1995
JP 2006-525928 A 11/2006

(Continued)

OTHER PUBLICATIONS

May 25, 2021, Indian Examination Report issued for related IN application No. 202017056008.

(Continued)

*Primary Examiner* — Kyle O Logan
(74) *Attorney, Agent, or Firm* — Paratus Law Group, PLLC

(57) ABSTRACT

A crane that controls an actuator on the basis of a target speed signal Vd of cargo W includes: a control device having a feedback control unit that calculates a target path signal Pdα of the cargo from the target speed signal Vd by integration to correct the target path signal Pdα on the basis of the differential of current position coordinates p(n) of the cargo W corresponding to the target path signal Pdα; and a feedforward control unit that adjusts a weight coefficient of a transfer function G(s) expressing the characteristics of the crane on the basis of a target path signal Pd1α that has been corrected. The target path signal Pd1α corrected by the feedback control unit is corrected using the transfer function G(s) for which the weight coefficient has been adjusted by the feedforward control unit.

6 Claims, 11 Drawing Sheets

(56) References Cited

U.S. PATENT DOCUMENTS

| | | | | |
|---|---|---|---|---|
| 5,785,191 | A * | 7/1998 | Feddema | B66C 13/063 212/275 |
| 8,005,598 | B2 * | 8/2011 | Terashima | B66C 13/063 700/55 |
| 2009/0008351 | A1 * | 1/2009 | Schneider | B66C 13/46 212/278 |
| 2012/0296519 | A1 * | 11/2012 | Eberharter | B63B 27/10 701/34.4 |
| 2013/0245816 | A1 * | 9/2013 | Langer | B66C 13/02 700/228 |
| 2013/0245817 | A1 * | 9/2013 | Schneider | B66C 13/02 700/228 |
| 2016/0016763 | A1 * | 1/2016 | Lee | B66C 13/46 212/275 |

FOREIGN PATENT DOCUMENTS

| | | |
|---|---|---|
| JP | 2010-228905 A | 10/2010 |
| JP | 2016-221661 A | 12/2016 |

OTHER PUBLICATIONS

Sep. 3, 2019, International Search Report issued for related PCT application No. PCT/JP2019/028259.

Sep. 3, 2019, International Search Opinion issued for related PCT application No. PCT/JP2019/028259.

Hayashi et al., Trajectory Planning of Rotary Crane Control Based on Inverse Dynamics, Proceedings of the 23rd Annual Conference of the Robotics Society of Japan, Sep. 15-17, 2005, pp. 1-3, The Robotics Society of Japan.

* cited by examiner

CRANE AND CONTROL SYSTEM FOR CRANE

CROSS REFERENCE TO PRIOR APPLICATION

This application is a National Stage Patent Application of PCT International Patent Application No. PCT/JP2019/028259 (filed on Jul. 18, 2019) under 35 U.S.C. § 371, which claims priority to Japanese Patent Application No. 2018-139849 (filed on Jul. 25, 2018), which are all hereby incorporated by reference in their entirety.

TECHNICAL FIELD

The present invention relates to a crane and a control system for the crane.

BACKGROUND ART

Conventionally, as mobile cranes or the like, a crane in which each actuator is manipulated by a manipulation terminal or the like has been proposed. Such crane is manipulated according to a manipulative command signal from the manipulation terminal, the manipulative command signal being generated with reference to a load, and thus, it is possible to intuitively manipulate the crane without paying attention to an operating speed, an operating amount, an operating timing and the like of each of the actuators. For example, see Patent Literature (hereinafter abbreviated as PTL) 1.

In the case of the crane described in PTL 1, a speed signal relating to a manipulation speed of a manipulation tool and a direction signal relating to a manipulation direction of the manipulation tool are transmitted from the manipulation terminal to the crane. Therefore, in the crane, at a start or stop of movement at which a speed signal from the manipulation terminal is input in the form of a step function, discontinuous acceleration sometimes occurs, causing swinging of the load. Therefore, a technique in which optimal control using a speed of a crane, a position, and a swing angular speed and a swing angle of a load as feedback amounts is employed and the control is performed according to a speed signal that allows positioning of the crane at a target position and minimization of the swing angle of the load, by compensation of a lag by a predictive gain has been known. For example, see PTL 2.

The crane described in PTL 2 is controlled based on a mathematical model determined in advance such that swinging of a load is minimized by enhancement in positioning accuracy of the crane. Therefore, if the mathematical model has a large error, an error in future predictive value also becomes large, which causes the disadvantages of a decrease in positioning accuracy of the crane and an increase of swinging of the load.

CITATION LIST

Patent Literature

PTL 1
Japanese Patent Application Laid-Open No. 2010-228905
PTL 2
Japanese Patent Application Laid-Open No. H7-81876

SUMMARY OF INVENTION

Technical Problem

An object of the present invention is to provide a crane and a control system for the crane that enable, when an actuator is controlled with reference to a load, moving the load in a manner intended by an operator while curbing swinging of the load, by learning a dynamic characteristic of the crane.

Solution to Problem

The technical problem to be solved by the present invention has been stated above, and next, a solution to the problem will be explained.

The present invention provides a crane in which an actuator is controlled based on a target speed signal relating to a moving direction and a speed of a load suspended from a boom by a wire rope, the crane including: a manipulation tool with which an acceleration time, the speed and the moving direction of the load for the target speed signal are input; a swivel angle detection section for the boom; a luffing angle detection section for the boom; an extension/retraction length detection section for the boom; a load position detection section that detects a current position of the load relative to a reference position; and a control apparatus including a feedback control section that computes a target course signal for the load from the target speed signal by integration and corrects the target course signal based on a difference of the current position of the load from the target course signal, and a feedforward control section that adjusts a weight coefficient of a transfer function representing a characteristic of the crane based on the corrected target course signal, in which the control apparatus preferably obtains the current position of the load relative to the reference position from the load position detection section, and corrects the target course signal corrected by the feedback control section, using the transfer function with the weight coefficient adjusted by the feedforward control section, computes a current position of a tip of the boom relative to the reference position from a swivel angle detected by the swivel angle detection section, a luffing angle detected by the luffing angle detection section and an extension/retraction length detected by the extension/retraction length detection section, computes a let-out amount of the wire rope from the current position of the load and the current position of the tip of the boom, computes a direction vector of the wire rope from the current position of the load and a target position of the load, computes a target position of the tip of the boom for the target position of the load from the let-out amount of the wire rope and the direction vector of the wire rope, and generates an operation signal for the actuator based on the target position of the tip of the boom.

In the crane according to the present invention: the control apparatus includes a plurality of the feedforward control sections; and the transfer function is decomposed into one or more first-order models, the weight coefficient is provided for each of the one or more models, and the weight coefficient that is adjusted is assigned for each of the feedforward control sections.

In the crane according to according to the present invention, the transfer function is expressed by Expression 1 including a low-pass filter that curbs a predetermined frequency component:

(Expression 1)

$$G(s) = \frac{W\alpha 1}{s} + \frac{W\alpha 2}{(As+1)} + \frac{W\alpha 3}{(Bs+1)} + \frac{W\alpha 4}{(Cs+1)} \quad (1)$$

where each of A, B and C is a coefficient, each of wα1, wα2, wα3 and wα4 is a weight coefficient and s is a differentiation element.

The present invention provides a control system for a crane in which an actuator is controlled based on a target speed signal relating to a moving direction and a speed of a load, the control system including: a feedback control section that computes a target course signal for the load from the target speed signal by integration, corrects the target course signal based on a difference of a current position of the load from the target course signal for the load, and computes a target position of the load from the corrected target course signal; and a feedforward control section that adjusts a weight coefficient of a transfer function representing a characteristic of the crane based on the corrected target course signal and corrects the corrected target course signal using the transfer function with the weight coefficient adjusted, in which each time the target course signal is corrected by the feedback control section, the weight coefficient of the transfer function is adjusted by the feedforward control section.

In the control system for a crane according to the present invention: the control system includes a plurality of the feedforward control sections, and the transfer function is decomposed into one or more first-order models, the weight coefficient is provided for each of the one or more models, and the weight coefficient that is adjusted is assigned for each of the feedforward control sections.

In the control system for a crane according to the present invention, the transfer function is expressed by Expression 1 including a low-pass filter that curbs a predetermined frequency component:

(Expression 1)

$$G(s) = \frac{W\alpha 1}{s} + \frac{W\alpha 2}{(As+1)} + \frac{W\alpha 3}{(Bs+1)} + \frac{W\alpha 4}{(Cs+1)} \quad (1)$$

where each of A, B and C is a coefficient, each of wα1, wα2, wα3 and wα4 is a weight coefficient and s is a differentiation element.

Advantageous Effects of Invention

The present invention produces effects as stated below.

With the crane and the control system for the crane according to the present invention, feedback control is performed such that a load is moved to a target position based on a difference between a current position and the target position, and the weight coefficient of the transfer function is adjusted according to the difference, and thus, the transfer function of the crane is adjusted to be adapted to the characteristic of the crane during manipulation of the crane. Consequently, it is possible to, when the actuator is controlled with reference to a load, move the load in a manner intended by an operator while curbing swinging of the load, by learning a dynamic characteristic of the crane from movement of the load.

With the crane and the control system for the crane according to the present invention, a high-order transfer function is adjusted for each first-order model, and thus, flexibly responds to a change in dynamic characteristic. Consequently, it is possible to, when the actuator is controlled with reference to a load, move the load in a manner intended by an operator w % bile curbing swinging of the load, by learning a dynamic characteristic of the crane from movement of the load.

The crane and the control system for the crane according to the present invention enable determining the coefficient of the low-pass filter according to a dynamic characteristic of the crane. Consequently, it is possible to, when the actuator is controlled with reference to a load, move the load in a manner intended by an operator while curbing swinging of the load, by learning a dynamic characteristic of the crane from movement of the load.

DESCRIPTION OF EMBODIMENTS

As a working vehicle according to an embodiment of the present invention, crane 1, which is a mobile crane (rough terrain crane), will be described below with reference to FIGS. 1 and 2. Note that although the present embodiment will be described in terms of crane 1 (rough terrain crane) as a working vehicle, the working vehicle may also be an all-terrain crane, a truck crane, a truck loader crane, an aerial work vehicle, or the like.

Figure 1:
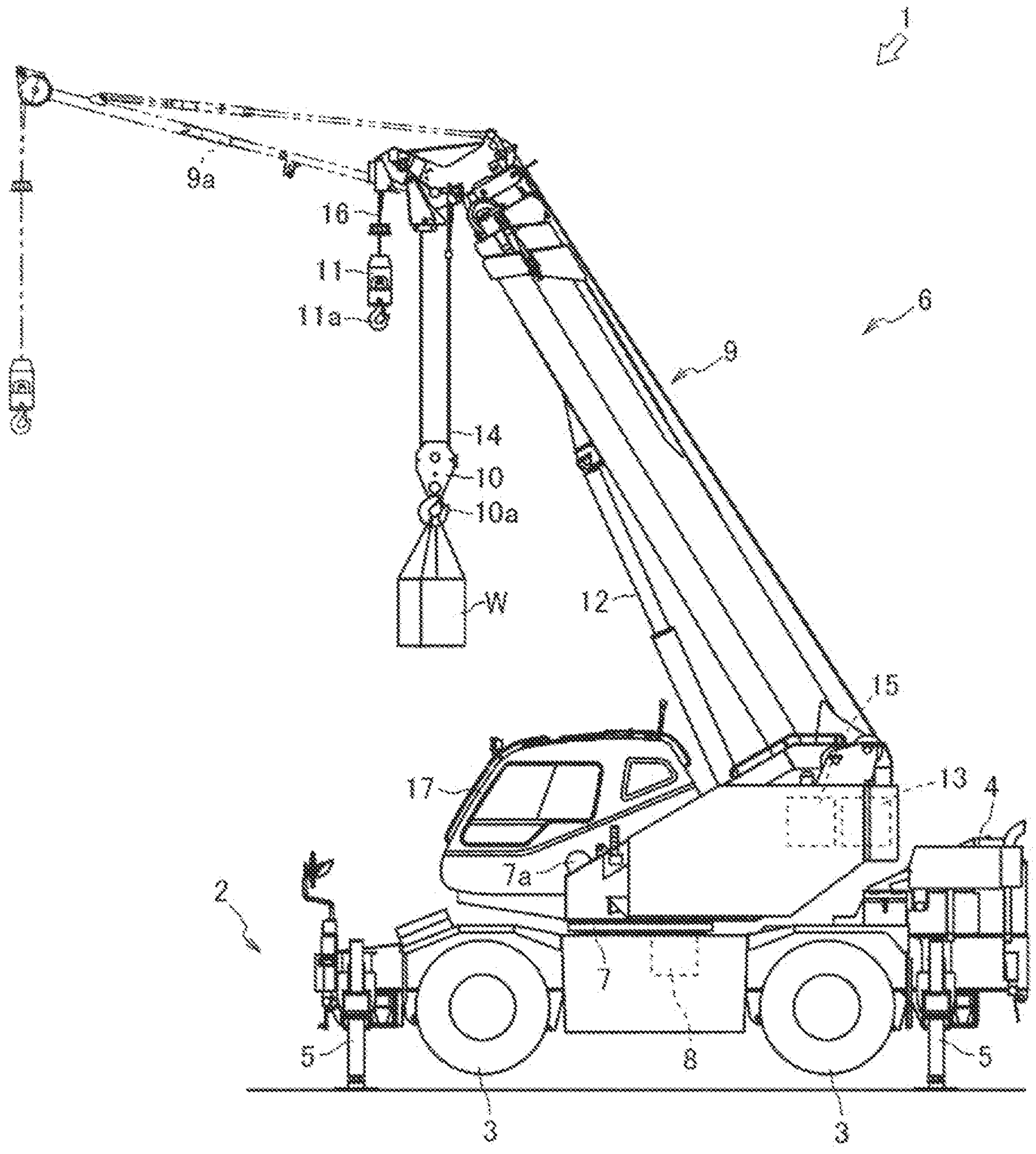
FIG. 1 is a side view illustrating an overall configuration of a crane.

As illustrated in FIG. 1, crane 1 is a mobile crane capable of moving to an unspecified place. Crane 1 includes vehicle 2 and crane apparatus 6, which is a working apparatus, and manipulation terminal 32 with which crane apparatus 6 can be manipulated (see FIG. 2).

Vehicle 2 is a travelling body that carries crane apparatus 6. Vehicle 2 includes a plurality of wheels 3 and travels using engine 4 as a power source. Vehicle 2 is provided with outriggers 5. Outriggers 5 are composed of projecting beams hydraulically extendable on opposite sides in a width direction of vehicle 2 and hydraulic jack cylinders extendable in a direction perpendicular to the ground. Vehicle 2 can expand a workable region of crane 1 by extending outriggers 5 in the width direction of vehicle 2 and bringing the jack cylinders into contact with the ground.

Crane apparatus 6 is a working apparatus that hoists up load W with a wire rope. Crane apparatus 6 includes, for example, swivel base 7, boom 9, jib 9*a*, main hook block 10, sub hook block 11, hydraulic luffing cylinder 12, main winch 13, main wire rope 14, sub winch 15, sub wire rope 16 and cabin 17.

Swivel base 7 is a drive apparatus configured to enable crane apparatus 6 to swivel. Swivel base 7 is disposed on a frame of vehicle 2 via an annular bearing. Swivel base 7 is configured to be rotatable with a center of the annular bearing as a rotational center. Swivel base 7 is provided with hydraulic swivel motor 8, which is an actuator. Swivel base 7 is configured to be capable of swiveling in one and other directions via hydraulic swivel motor 8.

Each of swivel-base cameras 7*b*, which form a load position detection section, is a monitoring apparatus that takes an image of, for example, obstacles and people around swivel base 7. Swivel-base cameras 7*b* are provided on opposite, left and right, sides of the front of swivel base 7 and opposite, left and right, sides of the rear of swivel base 7. The swivel-base cameras 7*b* take images of respective areas around places at which swivel-base cameras 7*b* are installed, to cover an entire area surrounding swivel base 7 as a monitoring area. Furthermore, swivel-base cameras 7*b* disposed on the opposite, left and right, sides of the front of swivel base 7 are configured to be usable as a stereo camera set. In other words, swivel-base cameras 7*b* at the front of swivel base 7 can be configured as a load position detection section that detects positional information of suspended load W, by being used as a stereo camera set. Note that the load position detection section (swivel-base cameras 7*b*) may be composed of later-described boom camera 9*b*. Also, the load position detection section only needs to be one that is capable of detecting positional information of load W such as a millimeter-wave radar, an acceleration sensor, a GNSS apparatus, or the like.

Hydraulic swivel motor 8 is an actuator that is manipulated to rotate via swivel valve 23 (see FIG. 2), which is an electromagnetic proportional switching valve. Swivel valve 23 can control a flow rate of an operating oil supplied to hydraulic swivel motor 8 to any flow rate. In other words, swivel base 7 is configured to be controllable to have any swivel speed via hydraulic swivel motor 8 manipulated to rotate via swivel valve 23. Swivel base 7 is provided with swivel sensor 27 (see FIG. 2) that detects swivel angle θz (angle) and swivel speed of swivel base 7.

Boom 9 is a movable boom that supports a wire rope such that load W can be hoisted. Boom 9 is composed of a plurality of boom members. In boom 9, a base end of a base boom member is swingably provided at a substantial center of swivel base 7. Boom 9 is configured to be capable of being axially extended/retracted by moving the respective boom members with a non-illustrated hydraulic extension/retraction cylinder, which is an actuator. Also, boom 9 is provided with jib 9*a*.

The non-illustrated hydraulic extension/retraction cylinder is an actuator to be manipulated to extend and retract via extension/retraction valve 24 (see FIG. 2), which is electromagnetic proportional switching valve. Extension/retraction valve 24 can control a flow rate of an operating oil supplied to the hydraulic extension/retraction cylinder to any flow rate. Boom 9 is provided with extension/retraction sensor 28 that detects a length of boom 9 and azimuth sensor 29 that detects an azimuth with a tip of boom 9 as a center.

Boom camera 9*b* (see FIG. 2) is a sensing apparatus that takes an image of load W and features around load W. Boom camera 9*b* is provided at a tip portion of boom 9. Boom camera 9*b* is configured to be capable of taking an image of load W, and features and geographical features around crane 1 from vertically above load W.

Main hook block 10 and sub hook block 11 are suspending tools for suspending load W. Main hook block 10 is provided with a plurality of hook sheaves around which main wire rope 14 is wound and main hook 10*a* for suspending load W. Sub hook block 11 is provided with sub hook 11*a* for suspending load W.

Hydraulic luffing cylinder 12 is an actuator that luffs up and down boom 9 and holds a posture of boom 9. In hydraulic luffing cylinder 12, an end portion of a cylinder part is swingably coupled to swivel base 7 and an end portion of a rod part is swingably coupled to the base boom member of boom 9. Hydraulic luffing cylinder 12 is manipulated to extend or retract via luffing valve 25 (see FIG. 2), which is an electromagnetic proportional switching valve. Luffing valve 25 can control a flow rate of an operating oil supplied to hydraulic luffing cylinder 12 to any flow rate. Boom 9 is provided with luffing sensor 30 (see FIG. 2) that detects luffing angle θx.

Main winch 13 and sub winch 15 are winding apparatuses that pull in (wind) or let out (unwind) main wire rope 14 and sub wire rope 16. Main winch 13 is configured such that a main drum around which main wire rope 14 is wound is rotated by a non-illustrated main hydraulic motor, which is an actuator, and sub winch 15 is configured such that a sub drum around which sub wire rope 16 is wound is rotated by a non-illustrated sub hydraulic motor, which is an actuator.

The main hydraulic motor is manipulated to rotate via main valve 26*m* (see FIG. 2), which is an electromagnetic proportional switching valve. Main winch 13 is configured to be capable of being manipulated so as to have any pulling-in and letting-out speeds, by controlling the main hydraulic motor via main valve 26*m*. Likewise, sub winch 15 is configured to be capable of being manipulated so as to have any pulling-in and letting-out speeds, by controlling the sub hydraulic motor via sub valve 26*s* (see FIG. 2), which is an electromagnetic proportional switching valve. Main winch 13 and sub winch 15 are provided with winding sensors 43 (see FIG. 2) that detect let-out amounts 1 of main wire rope 14 and sub wire rope 16, respectively.

Cabin 17 is an operator compartment covered by a housing. Cabin 17 is mounted on swivel base 7. Cabin 17 is provided with a non-illustrated operator compartment. The operator compartment is provided with manipulation tools for manipulating vehicle 2 to travel, and swivel manipulation tool 18, luffing manipulation tool 19, extension/retraction manipulation tool 20, main drum manipulation tool 21*m*, sub drum manipulation tool 21*s* and the like for manipulating crane apparatus 6 (see FIG. 2). Hydraulic swivel motor 8 is manipulatable with swivel manipulation tool 18. Hydraulic luffing cylinder 12 is manipulatable with luffing manipulation tool 19. The hydraulic extension/retraction cylinder is manipulatable with extension/retraction manipulation tool 20. The main hydraulic motor is manipulatable with main drum manipulation tool 21*m*. The sub hydraulic motor is manipulatable with sub drum manipulation tool 21*s*.

Figure 2:
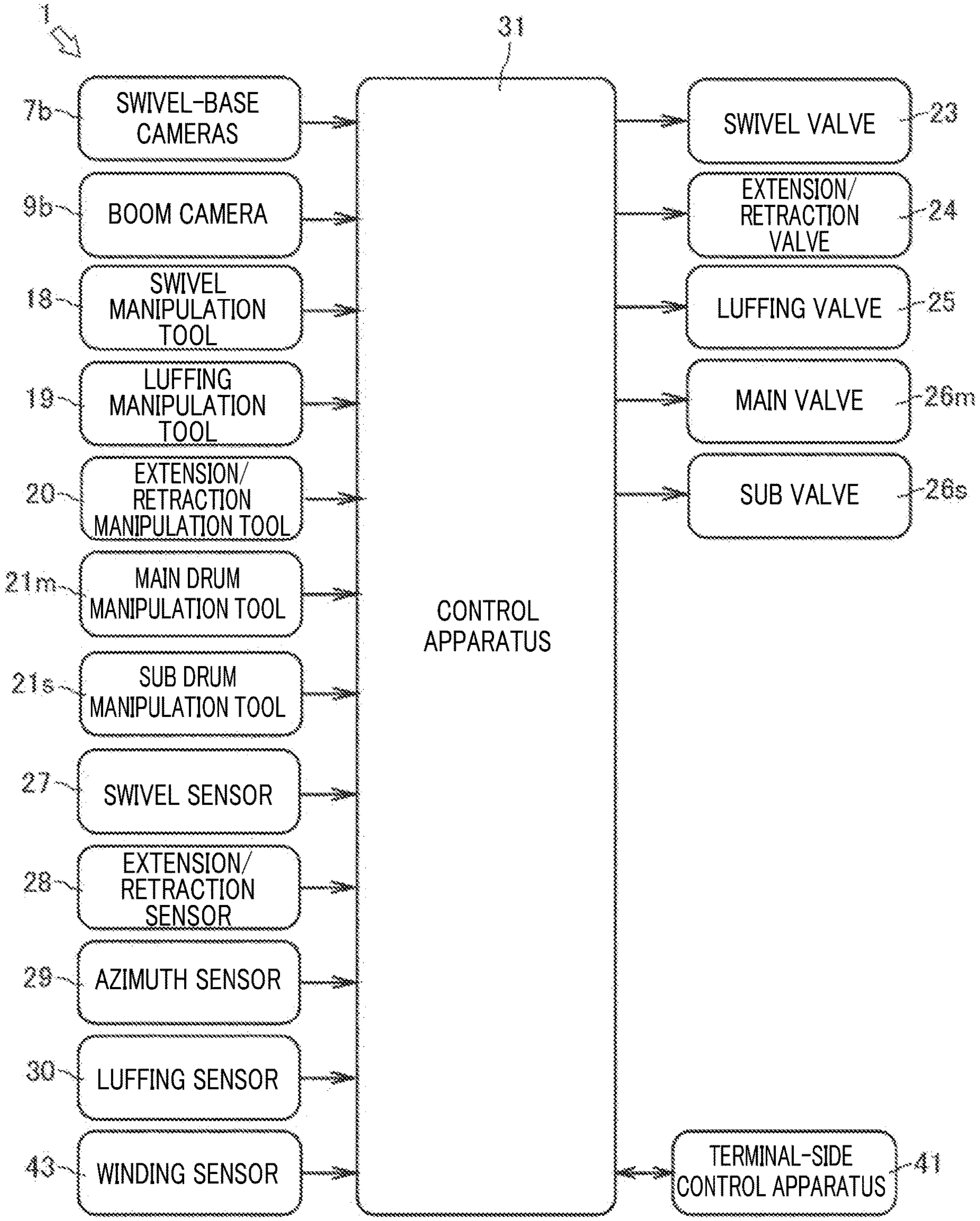
FIG. 2 is a block diagram illustrating a control configuration of the crane.

As illustrated in FIG. 2, control apparatus 31 is control apparatus that controls the actuators of crane apparatus 6 via the respective manipulation valves. Control apparatus 31 is disposed inside cabin 17. Substantively, control apparatus 31 may have a configuration in which a CPU, a ROM, a RAM, an HDD and/or the like are connected to one another via a bus or may be composed of a one-chip LSI or the like. Control apparatus 31 stores various programs and/or data in order to control operation of the actuators, the switching valves, the sensors and/or the like.

Control apparatus 31 is connected to swivel-base cameras 7*b*, boom camera 9*b*, swivel manipulation tool 18, luffing manipulation tool 19, extension/retraction manipulation tool 20, main drum manipulation tool 21*m* and sub drum manipulation tool 21*s*, and is capable of obtaining image i1 from swivel-base cameras 7*b* and image i2 from boom camera 9*b* and is also capable of obtaining respective manipulation amounts of swivel manipulation tool 18, luffing manipulation tool 19, main drum manipulation tool 21*m* and sub drum manipulation tool 21*s*.

Control apparatus 31 is connected to terminal-side control apparatus 41 of manipulation terminal 32 and is capable of obtaining a control signal from manipulation terminal 32.

Control apparatus 31 is connected to swivel valve 23, extension/retraction valve 24, luffing valve 25, main valve 26*m* and sub valve 26*s*, and is capable of transmitting operation signals Md to swivel valve 23, luffing valve 25, main valve 26*m* and sub valve 26*s*.

Control apparatus 31 is connected to swivel sensor 27, extension/retraction sensor 28, azimuth sensor 29, luffing sensor 30 and winding sensor 43, and is capable of obtaining swivel angle θz of swivel base 7, extension/retraction length Lb, luffing angle θx, let-out amount l(n) and an azimuth of main wire rope 14 or sub wire rope 16 (hereinafter simply referred to as "wire rope").

Control apparatus 31 generates operation signals Md for swivel manipulation tool 18, luffing manipulation tool 19, main drum manipulation tool 21*m* and sub drum manipulation tool 21*s* based on manipulation amounts of the respective manipulation tools.

Crane 1 configured as described above is capable of moving crane apparatus 6 to any position by causing vehicle 2 to travel. Crane 1 is also capable of increasing a lifting height and/or an operating radius of crane apparatus 6, for example, by luffing up boom 9 to any luffing angle θx with hydraulic luffing cylinder 12 by means of manipulation of luffing manipulation tool 19 and/or extending boom 9 to any length of boom 9 by means of manipulation of extension/retraction manipulation tool 20. Crane 1 is also capable of carrying load W by hoisting up load W with sub drum manipulation tool 21*s* and/or the like and causing swivel base 7 to swivel by means of manipulation of swivel manipulation tool 18.

Figure 3:
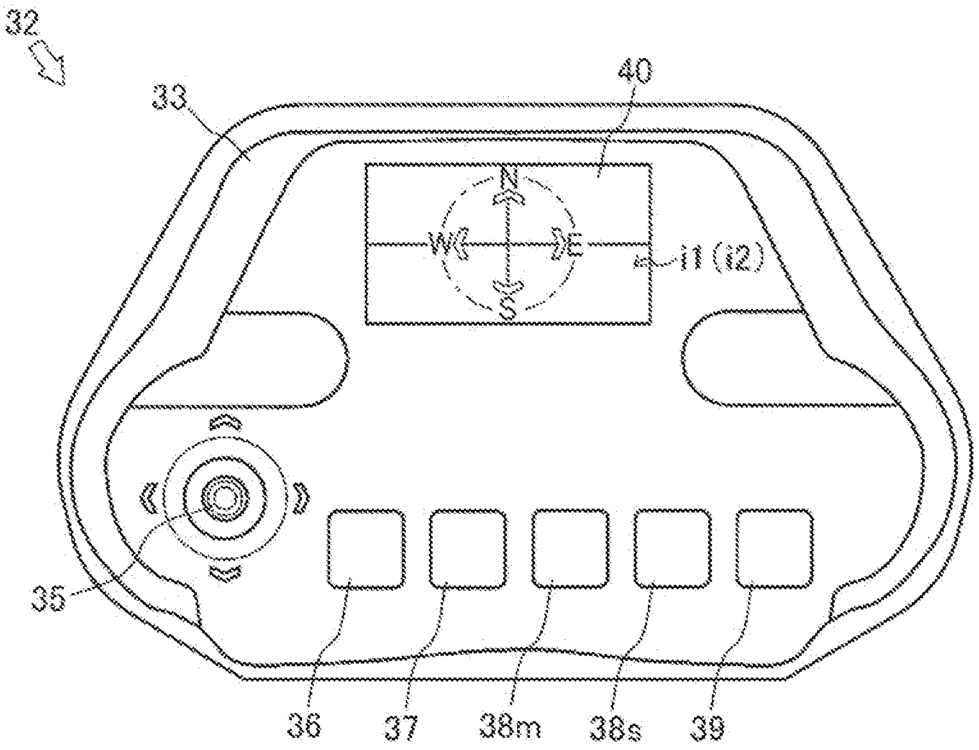
FIG. 3 is a plan view illustrating a schematic configuration of a manipulation terminal.
Figure 4:
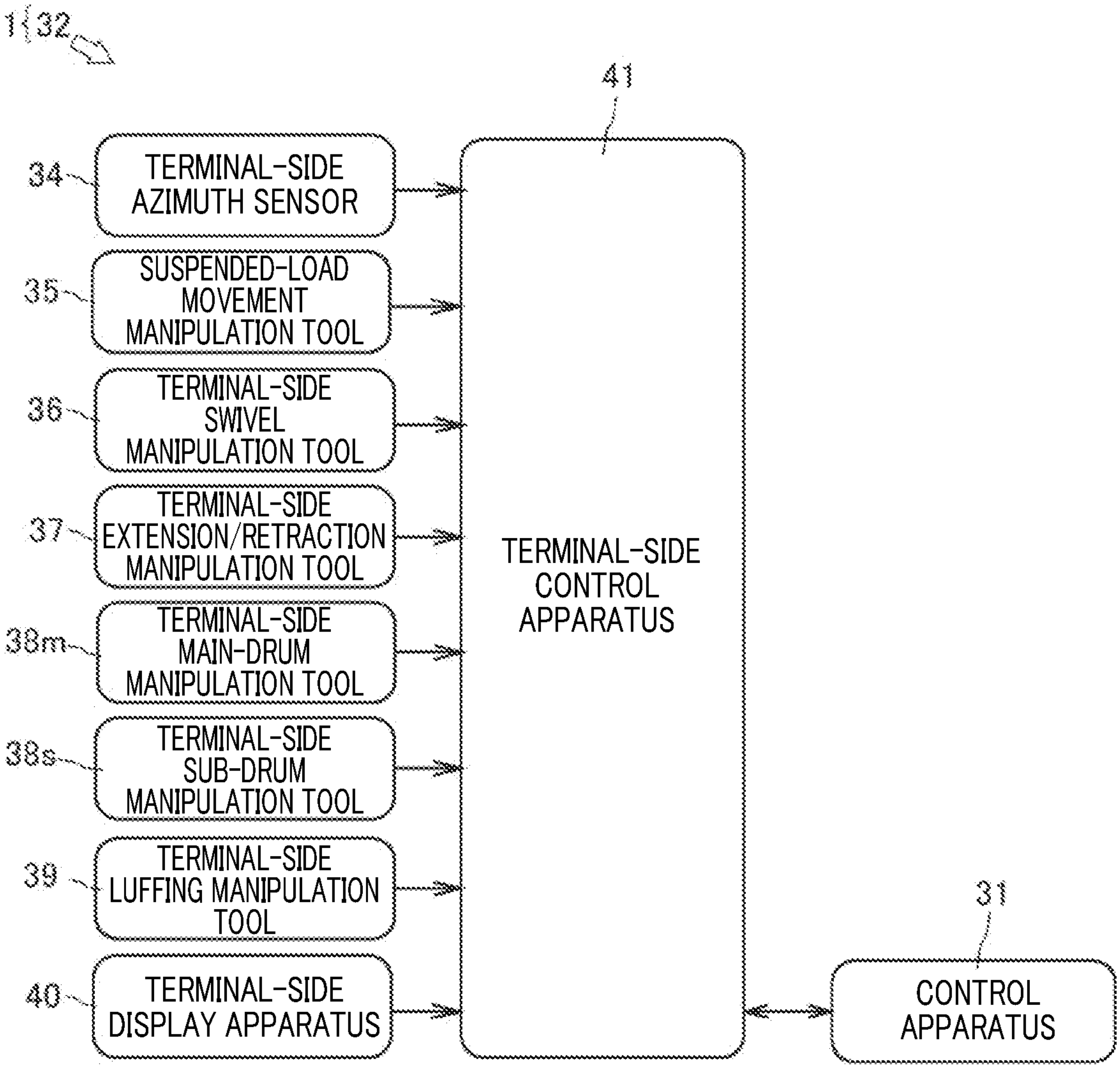
FIG. 4 is a block diagram illustrating a control configuration of the manipulation terminal.

As illustrated in FIGS. 3 and 4, manipulation terminal 32 is a terminal with which target speed signal Vd relating to a direction and a speed of movement of load W is input. Manipulation terminal 32 includes: for example, housing 33; suspended-load movement manipulation tool 35, terminal-side swivel manipulation tool 36, terminal-side extension/retraction manipulation tool 37, terminal-side main drum manipulation tool 38*m*, terminal-side sub drum manipulation tool 38*s*, terminal-side luffing manipulation tool 39 and terminal-side display apparatus 40 disposed on a manipulation surface of housing 33; and terminal-side control apparatus 41 (see FIGS. 3 and 5). Manipulation terminal 32 transmits target speed signal Vd of load W that is generated by manipulation of suspended-load movement manipulation tool 35 or any of the manipulation tools to control apparatus 31 of crane 1 (crane apparatus 6).

Suspended-load movement manipulation tool 35 is a manipulation tool with which an instruction on a direction and a speed of movement of load W in a horizontal plane is input. Suspended-load movement manipulation tool 35 is composed of a manipulation stick erected substantially perpendicularly from the manipulation surface of housing 33 and a non-illustrated sensor that detects a tilt direction and a tilt amount of the manipulation stick. Suspended-load movement manipulation tool 35 is configured such that the manipulation stick can be manipulated to be tilted in any direction. Suspended-load movement manipulation tool 35 is configured to transmit a manipulation signal on the tilt direction and the tilt amount of the manipulation stick detected by the non-illustrated sensor with an upward direction in plan view of the manipulation surface (hereinafter simply referred to as "upward direction") as a direction of extension of boom 9, to terminal-side control apparatus 41 (see FIG. 2).

Terminal-side swivel manipulation tool 36 is a manipulation tool with which an instruction on a swivel direction and a speed of crane apparatus 6 is input. Terminal-side extension/retraction manipulation tool 37 is a manipulation tool with which an instruction on extension/retraction and a speed of boom 9 is input. Terminal-side main drum manipulation tool 38*m* (terminal-side sub drum manipulation tool 38*s*) is a manipulation tool with which an instruction on a rotation direction and a speed of main winch 13 is input. Terminal-side luffing manipulation tool 39 is a manipulation tool with which an instruction on luffing and a speed of boom 9 is input. Each manipulation tool is composed of a manipulation stick substantially perpendicularly erected from the manipulation surface of housing 33 and a non-illustrated sensor that detects a tilt direction and a tilt amount of the manipulation stick. Each manipulation tool is configured to be tiltable to one side and the other side.

Terminal-side display apparatus 40 displays various kinds of information such as postural information of crane 1, information on load W and/or the like. Terminal-side display apparatus 40 is configured by an image display apparatus such as a liquid-crystal screen or the like. Terminal-side display apparatus 40 is provided on the manipulation surface of housing 33. Terminal-side display apparatus 40 displays an azimuth with the direction of extension of boom 9 as the upward direction in plan view of terminal-side display apparatus 40.

As illustrated in FIG. 4, terminal-side control apparatus 41, which is a control section, controls manipulation terminal 32. Terminal-side control apparatus 41 is disposed inside housing 33 of manipulation terminal 32. Substantively, terminal-side control apparatus 41 may have a configuration in which a CPU, a ROM, a RAM, an HDD and/or the like are connected to one another via a bus or may be composed of a one-chip LSI or the like. Terminal-side control apparatus 41 stores various programs and/or data in order to control operation of suspended-load movement manipulation tool 35, terminal-side swivel manipulation tool 36, terminal-side extension/retraction manipulation tool 37, terminal-side main drum manipulation tool 38*m*, terminal-side sub drum manipulation tool 38*s*, terminal-side luffing manipulation tool 39, terminal-side display apparatus 40 and/or the like.

Terminal-side control apparatus 41 is connected to suspended-load movement manipulation tool 35, terminal-side swivel manipulation tool 36, terminal-side extension/retraction manipulation tool 37, terminal-side main drum manipulation tool 38*m*, terminal-side sub drum manipulation tool 38*s* and terminal-side luffing manipulation tool 39, and is capable of obtaining manipulation signals each including a tilt direction and a tilt amount of the manipulation stick of the relevant manipulation tool.

Terminal-side control apparatus 41 is capable of generating target speed signal Vd of load W from manipulation signals of the respective sticks, the manipulation signals being obtained from the respective sensors of terminal-side swivel manipulation tool 36, terminal-side extension/retraction manipulation tool 37, terminal-side main drum manipulation tool 38*m*, terminal-side sub drum manipulation tool 38*s* and terminal-side luffing manipulation tool 39. Also, terminal-side control apparatus 41 is connected to control apparatus 31 of crane apparatus 6 wirelessly or via a wire, and is capable of transmitting generated target speed signal Vd of load W to control apparatus 31 of crane apparatus 6.

Next, control of crane apparatus 6 by manipulation terminal 32 will be described with reference to FIG. 5.

Figure 5:
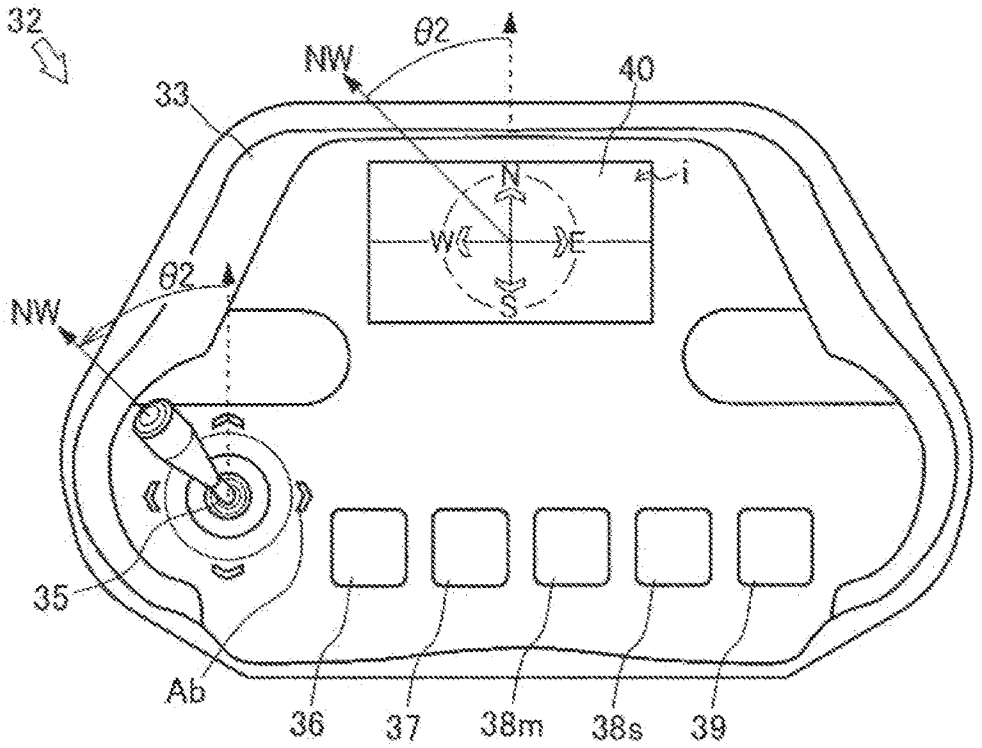
FIG. 5 illustrates an azimuth of a load carried in a case where a suspended-load movement manipulation tool is manipulated.

As illustrated in FIG. 5, when suspended-load movement manipulation tool 35 of manipulation terminal 32 is manipulated to be tilted leftward to a direction in which tilt angle θ2 is 45° relative to the upward direction by an arbitrary tilt amount in a state in which the tip of boom 9 faces north, terminal-side control apparatus 41 obtains a manipulation signal on a tilt direction and a tilt amount of a tilt to northwest, which is the direction in which tilt angle θ2 is 45°, from north, which is an extension direction of boom 9, from the non-illustrated sensor of suspended-load movement manipulation tool 35.

Furthermore, terminal-side control apparatus 41 computes target speed signal Vd for moving load W to northwest at a speed according to the tilt amount from the obtained manipulation signal, every unit time t. Manipulation terminal 32 transmits computed target speed signal Vd to control apparatus 31 of crane apparatus 6 every unit time t (see FIG. 4).

Upon receiving target speed signal Vd from manipulation terminal 32 every unit time t, control apparatus 31 computes target course signal Pd of load W based on an azimuth of the tip of boom 9, the azimuth being obtained from azimuth sensor 29. Furthermore, control apparatus 31 computes target position coordinate p(n+1) of load W, which is a target position of load W, from target course signal Pd. Control apparatus 31 generate respective operation signals Md for swivel valve 23, extension/retraction valve 24, luffing valve 25, main valve 26*m* and sub valve 26*s* to move load W to target position coordinate p(n+1) (see FIG. 7). Crane 1 moves load W toward northwest, which is the tilt direction of suspended-load movement manipulation tool 35, at a speed according to the tilt amount. In this case, crane 1 controls hydraulic swivel motor 8, a hydraulic extension/retraction cylinder, hydraulic luffing cylinder 12, the main hydraulic motor and/or the like based on the operation signals Md.

Crane 1 configured as described above obtains target speed signal Vd on a moving direction and a speed based on a direction of manipulation of suspended-load movement manipulation tool 35 with reference to the extension direction of boom 9, from manipulation terminal 32 every unit time and determines target position coordinate p(n+1) of load W, and prevents the operator from lose recognition of a direction of operation of crane apparatus 6 relative to a direction of manipulation of suspended-load movement manipulation tool 35. In other words, a direction of manipulation of suspended-load movement manipulation tool 35 and a direction of movement of load W are computed based on the extension direction of boom 9, which is a common reference. Consequently, it is possible to easily and simply manipulate crane apparatus 6. Note that although in the present embodiment, manipulation terminal 32 is provided inside cabin 17, but may be configured as a remote manipulation terminal that can remotely be manipulated from the outside of cabin 17, by providing a terminal-side radio device.

Next, an embodiment of a control process for computing target course signal Pd for load W, target course signal Pd being provided for generating operation signals Md, and target position coordinate q(n+1) of the tip of boom 9 in control apparatus 31 of crane apparatus 6 will be described with reference to FIGS. 6 to 12. Control apparatus 31 includes target course computation section 31*a*, boom position computation section 31*b* and operation signal generation section 31*c*. Also, control apparatus 31 is configured to be capable of obtaining current positional information of load W using the set of swivel-base cameras 7*b* on the opposite, left and right, sides of the front of swivel base 7 as a stereo camera, which is a load position detection section (see FIG. 2).

Figure 6:
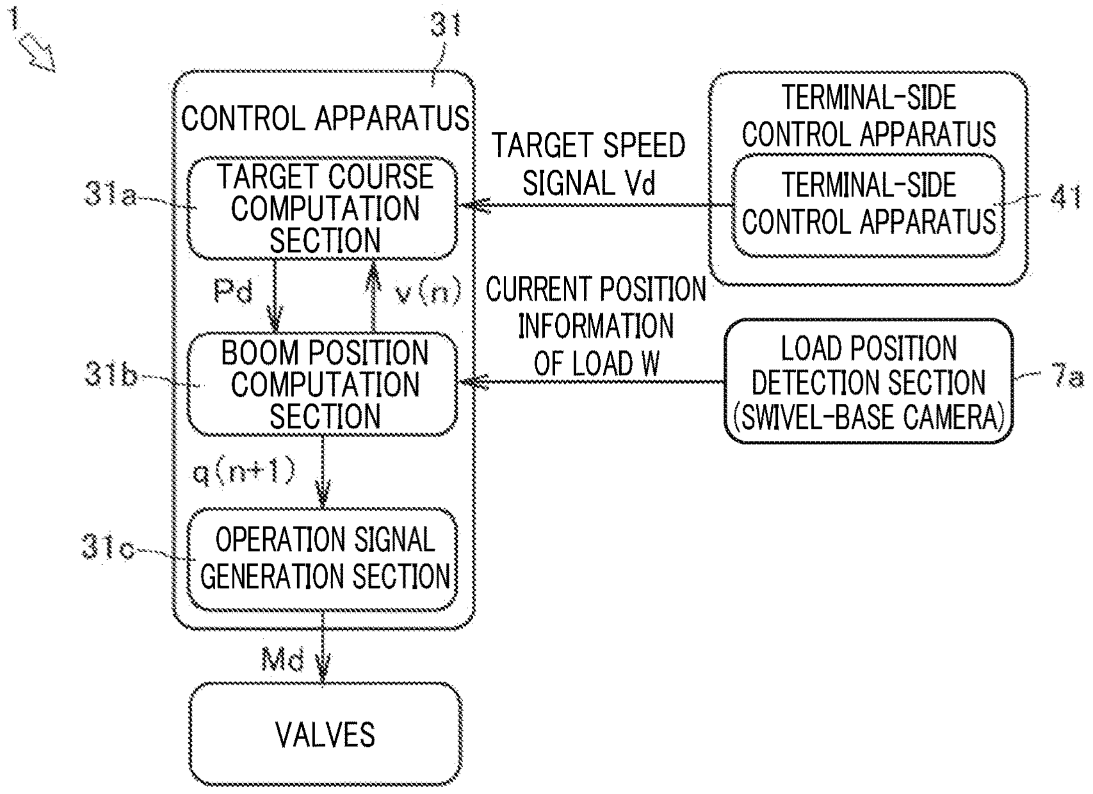
FIG. 6 is a block diagram illustrating a control configuration of a control apparatus in the present embodiment.

As illustrated in FIG. 6, target course computation section 31*a* is a part of control apparatus 31 and converts target speed signal Vd for load W into target course signal Pdα for load W. Target course computation section 31*a* can obtain target speed signal Vd for load W, which is composed of a moving direction and a speed of load W, from manipulation terminal 32 every unit time t. Also, target course computation section 31*a* can compute target course signals Pdα for an x-axis direction, a y-axis direction and a z-axis direction of load W for each unit time t, by integrating obtained target speed signal Vd. Here, the suffix "α" is a sign representing any of the x-axis direction, the y-axis direction and the z-axis direction.

Boom position computation section 31*b* is a part of control apparatus 31 and computes a position coordinate of the tip of boom 9 from postural information of boom 9 and target course signal Pdα for load W. Boom position computation section 31*b* can obtain target course signal Pdα from target course computation section 31*a*. Boom position computation section 31*b* can obtain swivel angle θz(n) of swivel base 7 from swivel sensor 27, obtain extension/retraction length lb(n) from extension/retraction sensor 28, obtain luffing angle θx(n) from luffing sensor 30, obtain let-out amount l(n) of main wire rope 14 or sub wire rope 16 (hereinafter simply referred to as "wire rope") from winding sensor 43 and obtain current positional information of load W from an image of load W taken by the set of swivel-base cameras 7*b* disposed on the opposite, left and right, sides of the front of swivel base 7 (see FIG. 2).

Boom position computation section 31*b* can compute current position coordinate p(n) of load W from the obtained current positional information of load W and compute current position coordinate q(n) of the tip (position from which the wire rope is let out) of boom 9 (hereinafter simply referred to as "current position coordinate q(n) of boom 9"), which is a current position of the tip of boom 9, from obtained swivel angle θz(n), obtained extension/retraction length lb(n) and obtained luffing angle θx(n). Also, boom position computation section 31*b* can compute let-out amount l(n) of the wire rope from current position coordinate p(n) of load W and current position coordinate q(n) of boom 9. Also, boom position computation section 31*b* can compute target position coordinate p(n+1) of load W, which is a position of load W after a lapse of unit time t, from target course signal Pd. Furthermore, boom position computation section 31*b* can compute direction vector e(n+1) of the wire rope from which load W is suspended, from current position coordinate p(n) of load W and target position coordinate p(n+1) of load W, which is a position of load W. Boom position computation section 31*b* is configured to compute target position coordinate q(n+1) of boom 9, which is a position of the tip of boom 9 after the lapse of unit time t, from target position coordinate p(n+1) of load W and direction vector e(n+1) of the wire rope, using inverse dynamics.

Operation signal generation section 31*c* is a part of control apparatus 31 and generates operation signals Md for the actuators from target position coordinate q(n+1) of boom 9 after the lapse of unit time t. Operation signal generation section 31*c* can obtain target position coordinate q(n+1) of boom 9 after the lapse of unit time t from boom position computation section 31*b*. Operation signal generation section 31*c* is configured to generate operation signals Md for swivel valve 23, extension/retraction valve 24, luffing valve 25, and main valve 26*m* or sub valve 26*s*.

Figure 7:
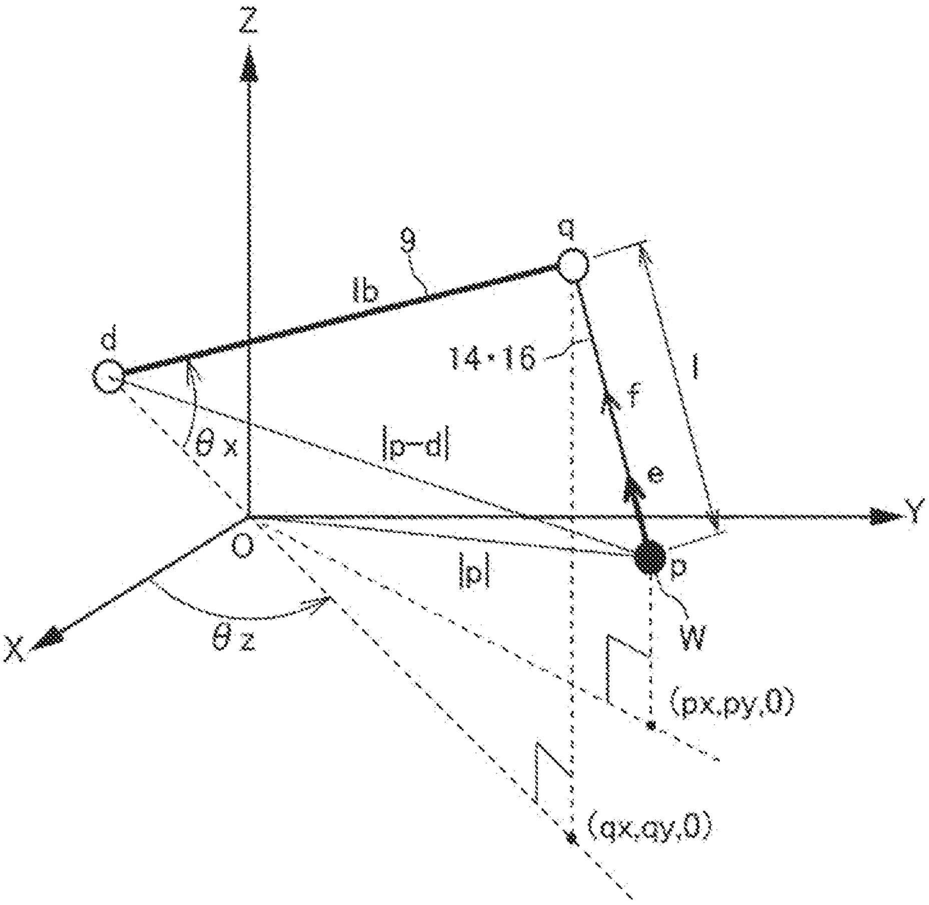
FIG. 7 is a diagram illustrating an inverse dynamics model of the crane.

Next, as illustrated in FIG. 7, control apparatus 31 determines an inverse dynamics model for crane 1 in order to compute target position coordinate q(n+1) of the tip of boom 9. The inverse dynamics model is defined on a XYZ coordinate system and reference position O is a center of swivel of crane 1. Control apparatus 31 defines q, p, lb, θx, θz, l, f and e, respectively, in the inverse dynamics model. The sign q denotes, for example, current position coordinate q(n) of the tip of boom 9 and p denotes, for example, current position coordinate p(n) of load W. The sign lb denotes, for example, extension/retraction length lb(n) of boom 9 and θx denotes, for example, luffing angle θx(n), and θz denotes, for example, swivel angle θz(n). The sign 1 denotes, for example, let-out amount l(n) of the wire rope, f denotes tension f of the wire rope, and e denotes, for example, direction vector e(n) of the wire rope.

In the inverse dynamics model defined as described above, a relationship between target position q of the tip of boom 9 and target position p of load W is represented by Expression 2 using target position p of load W, mass m of load W and spring constant kf of the wire rope, and target position q of the tip of boom 9 is computed according to Expression 3, which is a function of time for load W.

[2]

$$m\ddot{p}=mg+f=mg+k_f(q-p) \tag{2}$$

(Expression 2)

and

[3]

$$q(t)=p(t)+l(t,\alpha)e(t)=q(p(t),\ddot{p}(t),\alpha) \tag{3}$$

(Expression 3)

wherein f is a tension of wire rope, kf is a spring constant, m is a mass of load W, q is a current position or target position of the tip of boom 9, p is a current position or target position of load W, l is a let-out amount of the wire rope, e is a direction vector and g is a gravitational acceleration.

Let-out amount l(n) of the wire rope is computed according to Expression 4 below.

Let-out amount l(n) of the wire rope is defined by a distance between current position coordinate q(n) of boom 9, which is a position of the tip of boom 9, and current position coordinate p(n) of load W, which is a position of load W.

[4]

$$l(n)^2=|q(n)-p(n)|^2 \tag{4}$$

(Expression 4)

Direction vector e(n) of the wire rope is computed according to Expression 5 below.

Direction vector e(n) of the wire rope is a vector of tension f (see Expression 2) of the wire rope for a unit length. Tension f of the wire rope is computed by subtracting the gravitational acceleration from an acceleration of load W, the acceleration being computed from current position coordinate p(n) of load W and target position coordinate p(n+1) of load W after the lapse of unit time t.

(Expression 5)

$$e(n)=\frac{f}{|f|}=\frac{\ddot{p}(n)-g}{|\ddot{p}(n)-g|} \tag{5}$$

Target position coordinate q(n+1) of boom 9, which is a target position of the tip of boom 9 after the lapse of unit time t, is computed from Expression 6 representing Expression 2 as a function of n. Here, a denotes swivel angle θz(n) of boom 9.

Target position coordinate q(n+1) of boom 9 is computed from let-out amount l(n) of the wire rope, target position coordinate p(n+1) of load W and direction vector e(n+1) using inverse dynamics.

[6]

$$q(n+1)=p(n+1)+l(n,\alpha)e(t+1)=q(p(n+1),\ddot{p}(n+1),\alpha) \tag{6}$$

(Expression 6)

Next, a method for adjustment of wα1, wα2, wα3 and wα4 (see Expression 1), which are weight coefficients of transfer function G(s) of low-pass filter Lp, will be described with reference to FIG. 8. In crane 1, as control system 42, feedback control section 42*a* and feedforward control section 42*b* are configured by cooperation of target course computation section 31*a*, boom position computation section 31*b* and operation signal generation section 31*c* of control apparatus 31.

Low-pass filter Lp attenuates frequencies that are equal to or lower than a predetermined frequency. Low-pass filter Lp curbs occurrence of a singular point (abrupt positional change) caused by a differential operation, by applying low-pass filter Lp to target speed signal Vd for load W. Low-pass filter Lp is formed by transfer function G(s) in Expression 1. Transfer function G(s) is expressed in the form of a partial fraction decomposition where each of A, B and C is a coefficient, each of wα1, wα2, wα3 and wα4 is a weight coefficient and s is a differentiation element. Here, the suffix "a" is a sign representing any of the x-axis, the y-axis and the z-axis. In other words, transfer function G(s) in Expression 1 is set for each of the x-axis, the y-axis and the z-axis. In this way, each transfer function G(s) can be expressed as one resulting from superimposition of first-order lag transfer functions. Target speed signal Vd for load W is converted into later-described target course signals Pd2α by being multiplied by respective transfer functions G(s) of low-pass filter Lp. Target position coordinate p(n+1) of load W is computed from target course signals Pd2α.

(Expression 1)

$$G(s)=\frac{W\alpha 1}{s}+\frac{W\alpha 2}{(As+1)}+\frac{W\alpha 3}{(Bs+1)}+\frac{W\alpha 4}{(Cs+1)} \tag{1}$$

Figure 8:
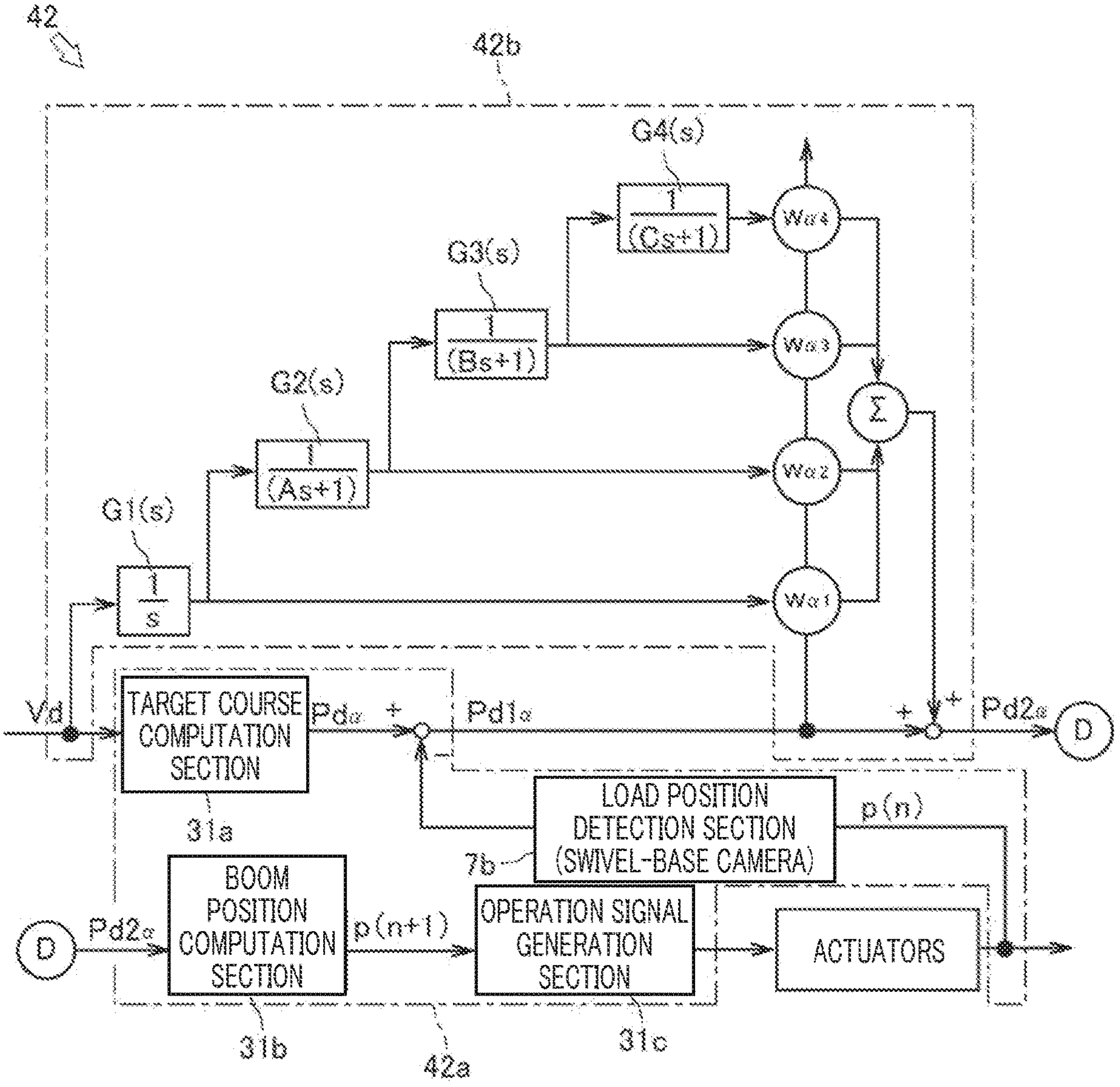
FIG. 8 is a block diagram illustrating a control configuration of a control system in the present embodiment.

As illustrated in FIG. 8, feedback control section 42*a* performs control based on a difference between a current position and a target position of a load. Feedback control section 42*a* includes target course computation section 31*a*, boom position computation section 31*b* and operation signal generation section 31*c* that are connected in series (see connection sign D) and is configured to feed current position coordinate p(n) of load W back to target course signals Pdα for load W.

Upon obtainment of target speed signal Vd for load W, feedback control section 42*a* computes target course signals Pdα for the x-axis direction, the y-axis direction and the z-axis direction of load W in target course computation section 31*a* Next, feedback control section 42*a* computes current position coordinate p(n) of load W from current position information of load W, the current position information being obtained from swivel-base cameras 7*b*, and (negatively) feeds current position coordinate p(n) back to the target course signals Pdα. Feedback control section 42*a* corrects target course signals Pdα based on a difference of current position coordinate p(n) of load W from target course signals Pdα to compute target course signals Pd1α.

Next, feedback control section 42*a* computes target position coordinate q(n+1) of boom 9 after a lapse of unit time t from later-described target course signals Pd2α corrected on the upstream side, information pieces (swivel angle θz(n), extension/retraction length lb(n), luffing angle θx(n) and let-out amount l(n)) of a posture of crane 1 obtained from the respective sensors and current position information of load W obtained from swivel-base cameras 7*b*, using inverse dynamics in boom position computation section 31*b*. Next, feedback control section 42*a* generates operation signals Md for the respective actuators from target position coordinate q(n+1) of boom 9 calculated by boom position computation section 31*b*, in operation signal generation section 31*c*. Feedback control section 42*a* makes the actuators of crane 1 operate according to operation signals Md to move load W.

Feedforward control section 42*b* performs control to apply low-pass filter Lp to target speed signal Vd of load W. In feedforward control section 42*b*, for example, each transfer function G(s) of fourth-order low-pass filter Lp is formed as a transfer function formed of four first-order models, first model G1(*s*), second model G2(*s*), third model G3(*s*) and fourth model G4(*s*), and the respective first-order models, each of which serves as a sub system, are combined in series. Feedforward control section 42*b* computes target course signals Pd2α with predetermined frequency components curbed, by applying low-pass filter Lp to target course signals Pd1α for load W corrected by feedback control section 42*a*.

In feedforward control section 42*b*, first model G1 (*s*), second model G2(*s*), third model G3(*s*) and fourth model G4(*s*), which are first-order lag transfer functions resulting from partial fraction decomposition of transfer function G(s) of fourth-order low-pass filter Lp, are superimposed on one another. Also, in feedforward control section 42*b*, using a gain of each transfer function G(s) as a weight coefficient, weight coefficient wα1 is assigned to first model G1(*s*), weight coefficient wα2 is assigned to second model G2(*s*), weight coefficient wα3 is assigned to third model G3(*s*) and weight coefficient wα4 is assigned to fourth model G4(*s*). Feedforward control section 42*b* adjusts weight coefficients wα1, wα2, wα3 and wα4 of the respective models based on relevant target course signal Pd1α for load W corrected by feedback control section 42*a*.

Upon obtainment of target speed signal Vd for load W, feedforward control section 42*b* applies first model G1(*s*) having weight coefficient wα1 to target speed signal Vd. Since in the present embodiment, first model G1(*s*) is an integration element, relevant target course signal Pdα for load W is computed from target speed signal Vd for load W. Next, feedforward control section 42*b* applies second model G2(*s*) having weight coefficient wα2 to an output from first model G1(*s*). Next, feedforward control section 42*b* applies third model G3(*s*) having weight coefficient wα3 to an output from second model G2(*s*). Next, feedforward control section 42*b* applies fourth model G4(*s*) having weight coefficient wα4 to an output from third model G3(*s*). Lastly, feedforward control section 42*b* computes target course signal Pd2α by adding up the outputs of the respective first-order models and further correcting target course signal Pd1α for load W corrected by feedback control section 42*a*. In other words, control system 42 of crane 1 further corrects target course signal Pd1α of load W corrected by feedback control section 42*a*, via feedforward control section 42*b*. Then, control system 42 of crane 1 computes target position coordinate q(n+1) of boom 9 from target course signals Pd2α.

Next, a control process for computation of target course signal Pd for load W and computation of target position coordinate q(n+1) of the tip of boom 9 in order to generate operation signals Md in control system 42 of crane 1 will be described in detail with reference to FIGS. 9 to 12.

Figure 9:
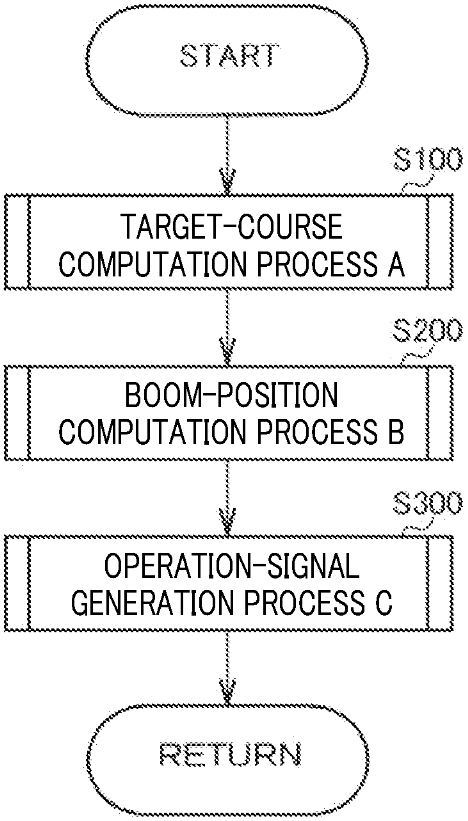
FIG. 9 is a flowchart illustrating a control process in a method for controlling the crane.
Figure 10:
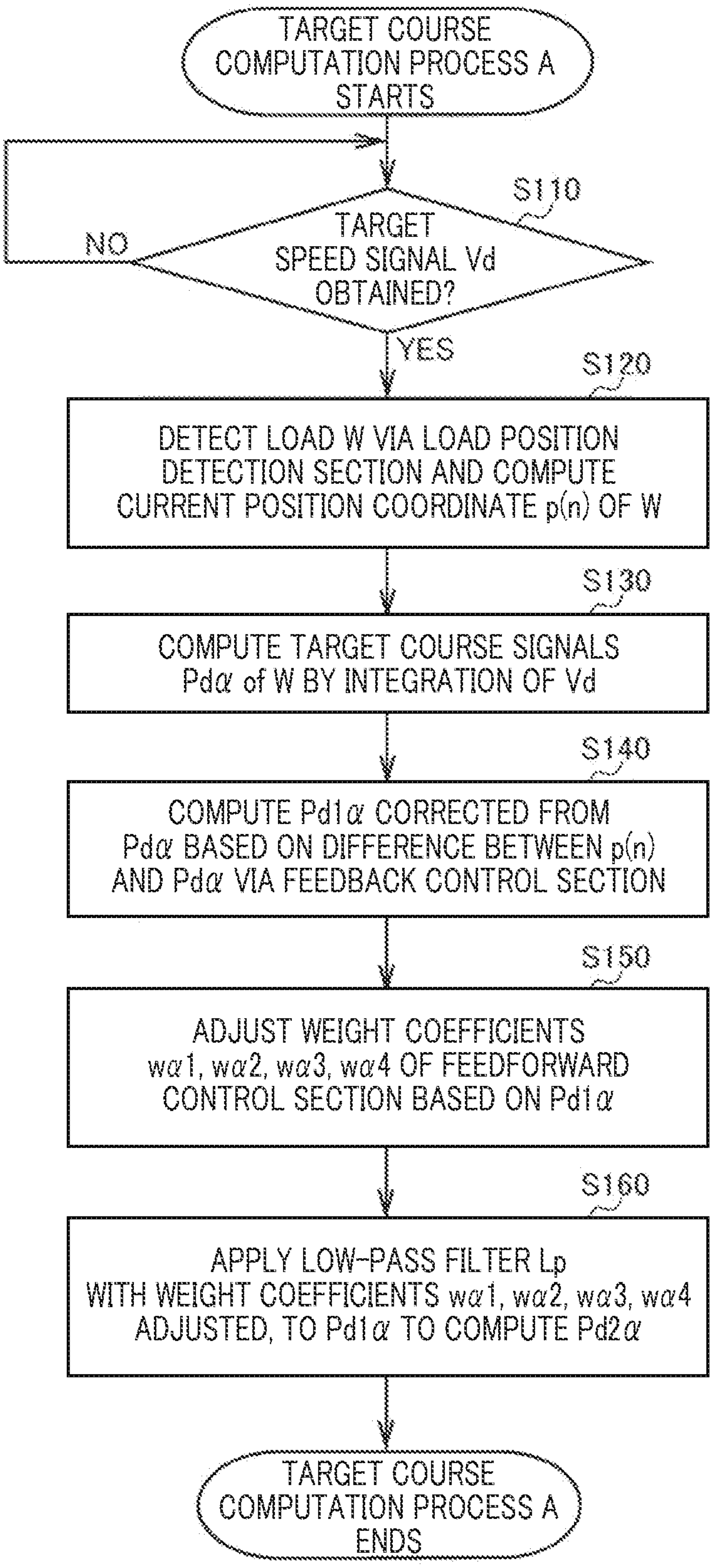
FIG. 10 is a flowchart illustrating a target-course computation process.

As illustrated in FIG. 9, in step S1100, control system 42 starts target-course computation process A and makes the control proceed to step S110 (see FIG. 10). Then, upon completion of target-course computation process A, the control proceeds to step S200 (see FIG. 9).

Figure 11:
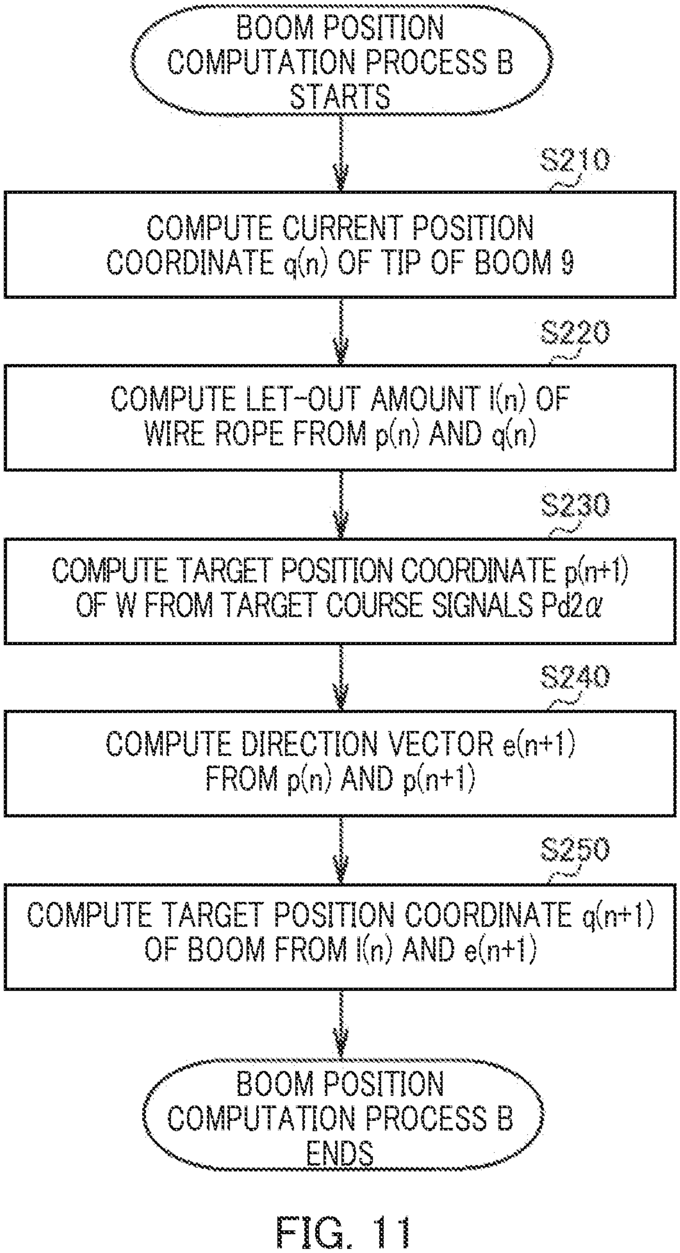
FIG. 11 is a flowchart illustrating a boom-position computation process.

In step S200, control system 42 starts boom-position computation process B and makes the control proceed to step S210 (see FIG. 11). Then, upon completion of boom-position computation process B, the control proceeds to step S300 (see FIG. 9).

Figure 12:
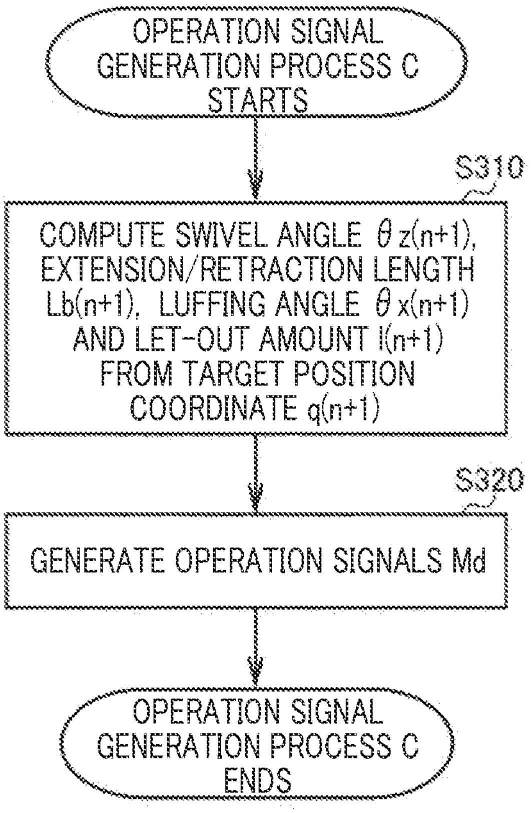
FIG. 12 is a flowchart illustrating an operation-signal generation process.

In step S300, control system 42 starts operation-signal generation process C and makes the control proceed to step S310 (see FIG. 12). Then, upon completion of operation-signal generation process C, the control proceeds to step S100 (see FIG. 9).

As illustrated in FIG. 10, in step S110, control system 42 determines whether or not target speed signal Vd for load W is obtained by target course computation section 31*a* of control apparatus 31.

As a result, if target speed signal Vd for load W is obtained, control system 42 makes the control proceed to S120.

On the other hand, if target speed signal Vd for load W is not obtained, control system 42 makes the control proceed to S110.

In step S120, control system 42 causes an image of load W to be taken using the set of swivel-base cameras 7*b* and computes current position coordinate p(n) of load W with arbitrarily-determined reference position O (for example, a center of swiveling of boom 9) as an origin, and makes the control proceed to step S130.

In step S130, control system 42 computes target course signals Pdα for load W by integrating target speed signal Vd for load W, target speed signal Vd being obtained by target course computation section 31*a*, and makes the control proceed to step S140.

In step S140, control system 42 corrects target course signals Pdα based on a difference between current position coordinate p(n) of load W and target course signals Pdα via feedback control section 42*a* to compute target course signals Pd1α, and makes the control proceed to step S150.

In step S150, control system 42 adjusts weight coefficients wα1, wα2, wα3 and wα4 of the respective first-order models (see FIG. 8) of each transfer function G(s) of low-pass filter Lp based on relevant target course signal Pd1α via feedforward control section 42_b_, and makes the control proceed to step S160.

In step S160, control system 42 applies low-pass filter Lp with weight coefficients wα1, wα2, wα3 and wα4 of the respective models adjusted to target course signals Pd1α to compute target course signals Pd2α, and ends target-course computation process A and makes the control proceed to step S200 (see FIG. 9).

As illustrated in FIG. 11, in step S210, control system 42 computes current position coordinate q(n) of the tip of boom 9 from obtained swivel angle θz(n) of swivel base 7, obtained extension/retraction length lb(n) and obtained luffing angle θx(n) of boom 9 via boom position computation section 31_b_, and makes the control proceed to step S220.

In step S220, control system 42 computes let-out amount l(n) of the wire rope from current position coordinate p(n) of load W and current position coordinate q(n) of boom 9 using Expression 4 above via boom position computation section 31_b_, and makes the control proceed to step S230.

In step S230, control system 42 computes target position coordinate p(n+1) of load W, which is a target position of load W after a lapse of unit time t, from target course signals Pd2α with reference to current position coordinate p(n) of load W via boom position computation section 31_b_, and makes the control proceed to step S240.

In step S240, control system 42 computes an acceleration of load W from current position coordinate p(n) of load W and target position coordinate p(n+1) of load W and computes direction vector e(n+1) of the wire rope according to Expression 5 above using the gravitational acceleration via boom position computation section 31_b_, and makes the control proceed to step S250.

In step S250, control system 42 computes target position coordinate q(n+1) of boom 9 from computed let-out amount l(n) of the wire rope and computed direction vector e(n+1) of the wire rope using Expression 6 via boom position computation section 31_b_, and ends boom position computation process B and makes the control proceed to step S300 (see FIG. 9).

As illustrated in FIG. 12, in step S310, control system 42 computes swivel angle θz(n+1) of swivel base 7, extension/retraction length Lb(n+1), luffing angle θx(n+1) and let-out amount l(n+1) of the wire rope after the lapse of unit time t from target position coordinate q(n+1) of boom 9 via operation signal generation section 31_c_, and makes the control proceed to step S320.

In step S320, control system 42 generates respective operation signals Md for swivel valve 23, extension/retraction valve 24, luffing valve 25 and main valve 26_m_ or sub valve 26_s_ from computed swivel angle 9_z_(n+1) of swivel base 7, computed extension/retraction length Lb(n+1), computed luffing angle θx(n+1) and computed let-out amount l(n+1) of the wire rope via operation signal generation section 31_c_, and ends operation signal generation process C and makes the control proceed to step S100) (see FIG. 9).

Control system 42 of crane 1 computes target position coordinate q(n+1) of boom 9, and after a lapse of unit time t, computes direction vector e(n+2) of the wire rope from let-out amount l(n+1) of the wire rope, current position coordinate p(n+1) of load W and target position coordinate p(n+2) of load W. and further computes target position coordinate q(n+2) of boom 9 after the lapse of unit time t, by repeating target course computation process A, boom position computation process B and operation signal generation process C. In other words, control system 42 computes direction vector e(n) of the wire rope and sequentially computes target position coordinate q(n+1) of boom 9 unit time t after from current position coordinate p(n+1) of load W, target position coordinate p(n+1) of load W and direction vector e(n) of the wire rope, using inverse dynamics.

Control system 42 generates operation signals Md based on target position coordinate q(n+1) of boom 9 to control the actuators.

As described above, crane 1 and control system 42 of crane 1 can be regarded as forming a single-layer neural network by using models each having a clear physical characteristic as a plurality of sub systems and multiplying each of outputs of the plurality of sub systems by a relevant weight coefficient. Control system 42 of crane 1 controls the actuators based on a difference between current position coordinate p(n) of load W and target course signals Pdα via feedback control section 42_a_, and individually adjusts the respective weight coefficients based on the difference between current position coordinate p(n) of load W and target course signals Pd1α, using the respective first-order models forming low-pass filter Lp as sub systems, via feedforward control section 42_b_. In other words, during operation of crane 1, control system 42 of crane 1 determines the coefficient of low-pass filter Lp while flexibly responding to changes in dynamic characteristic of crane 1. In other words, a high-order transfer function is adjusted for each first-order model. Consequently, it is possible to, when the actuators are controlled with reference to a load, move the load in a manner intended by an operator while curbing swinging of the load, by learning a dynamic characteristic of crane 1 from movement of the load. In the present embodiment, in control system 42, each of the first-order models of low-pass filter Lp is used as a sub system, but other models each having a clear physical characteristic may be used.

Each of the embodiments described above merely indicate a typical mode and can be variously modified and carried out without departing from the essence of an embodiment. Furthermore, it is needless to say that the present invention can be carried out in various modes, and the scope of the present invention is defined by the terms of the claims and includes any modifications within the scope and meaning equivalent to the terms of the claims.

INDUSTRIAL APPLICABILITY

The present invention is applicable to a crane and a control system for the crane.

REFERENCE SIGNS LIST

1 Crane
6 Crane apparatus
9 Boom
31 control apparatus
O reference position
W load
Vd target speed signal
Pdα target course signal
wα1, wα2, wα3, wα4 weight coefficient
G(s) transfer function

The invention claimed is:

1. A crane in which an actuator is controlled based on a target speed signal relating to a moving direction and a speed of a load suspended by a wire rope supported by a boom, the crane comprising:

a manipulation tool with which the speed and the moving direction of the load for the target speed signal are input; and control circuitry including a feedback control section that is configured to compute a target course signal for the load by integrating the target speed signal and generates a first correction target course signal by subtracting a signal relating to the current position of the load from the target course signal, and a feedforward control section that is configured to adjust a weight coefficient of a transfer function representing a characteristic of the crane based on the first correction target course signal, wherein the control circuitry is configured to generate a second correction target course signal by correcting the first correction target course signal with the output of the feedforward control section, compute a current position of a tip of the boom relative to the reference position based on a swivel angle of the boom, a luffing angle of the boom and an extension/retraction length of the boom, compute a let-out amount of the wire rope based on the current position of the load and the current position of the tip of the boom, compute a direction vector of the wire rope based on the current position of the load and a target position of the load computed based on the second correction target course signal, compute a target position of the tip of the boom for the target position of the load based on the let-out amount of the wire rope and the direction vector of the wire rope, and generate an operation signal for the actuator based on the target position of the tip of the boom.

2. The crane according to claim 1, wherein:

the control apparatus includes a plurality of the feedforward control sections; and the transfer function is decomposed into one or more first-order models, the weight coefficient is provided for each of the one or more models, and the weight coefficient that is adjusted is assigned for each of the feedforward control sections.

3. The crane according to claim 1 or 2, wherein the transfer function is expressed by Expression 1 including a low-pass filter that curbs a predetermined frequency component:

[1]

(Expression 1)

$$G(s) = \frac{W\alpha 1}{s} + \frac{W\alpha 2}{(As+1)} + \frac{W\alpha 3}{(Bs+1)} + \frac{W\alpha 4}{(Cs+1)} \quad (1)$$

where each of A, B and C is a coefficient, each of wα1, wα2, wα3 and wα4 is a weight coefficient and s is a differentiation element.

4. A control system for a crane in which an actuator is controlled based on a target speed signal relating to a moving direction and a speed of a load, the control system comprising:

a feedback control section configured to compute a target course signal for the load by integrating the target speed generate a first correction target course signal by subtracting a signal relating to the current position of the load from the target course signal, and compute a target position of the load based on the first correction target course signal; and a feedforward control section configured to adjust a weight coefficient of a transfer function representing a characteristic of the crane based on the first correction target course signal and correct the first correction target course signal by an output generated based on the target speed signal and the transfer function with the weight coefficient adjusted, wherein each time the target course signal is corrected in the feedback control section, the weight coefficient of the transfer function is adjusted by the feedforward control section.

5. The control system for a crane according to claim 4, wherein:

the control system includes a plurality of the feedforward control sections; and the transfer function is decomposed into one or more first-order models, the weight coefficient is provided for each of the one or more models, and the weight coefficient that is adjusted is assigned for each of the feedforward control sections.

6. The control system for a crane according to claim 4, wherein the transfer function is expressed by Expression 1 including a low-pass filter that curbs a predetermined frequency component:

[1]

(Expression 1)

$$G(s) = \frac{W\alpha 1}{s} + \frac{W\alpha 2}{(As+1)} + \frac{W\alpha 3}{(Bs+1)} + \frac{W\alpha 4}{(Cs+1)} \quad (1)$$

where each of A, B and C is a coefficient, each of wα1, wα2, wα3 and wα4 is a weight coefficient and s is a differentiation element.

* * * * *